Jan. 23, 1934.  A. OBERHOFFKEN  1,944,362
HYDRAULIC FEED FOR MACHINE TOOLS
Filed March 11, 1929  4 Sheets-Sheet 1
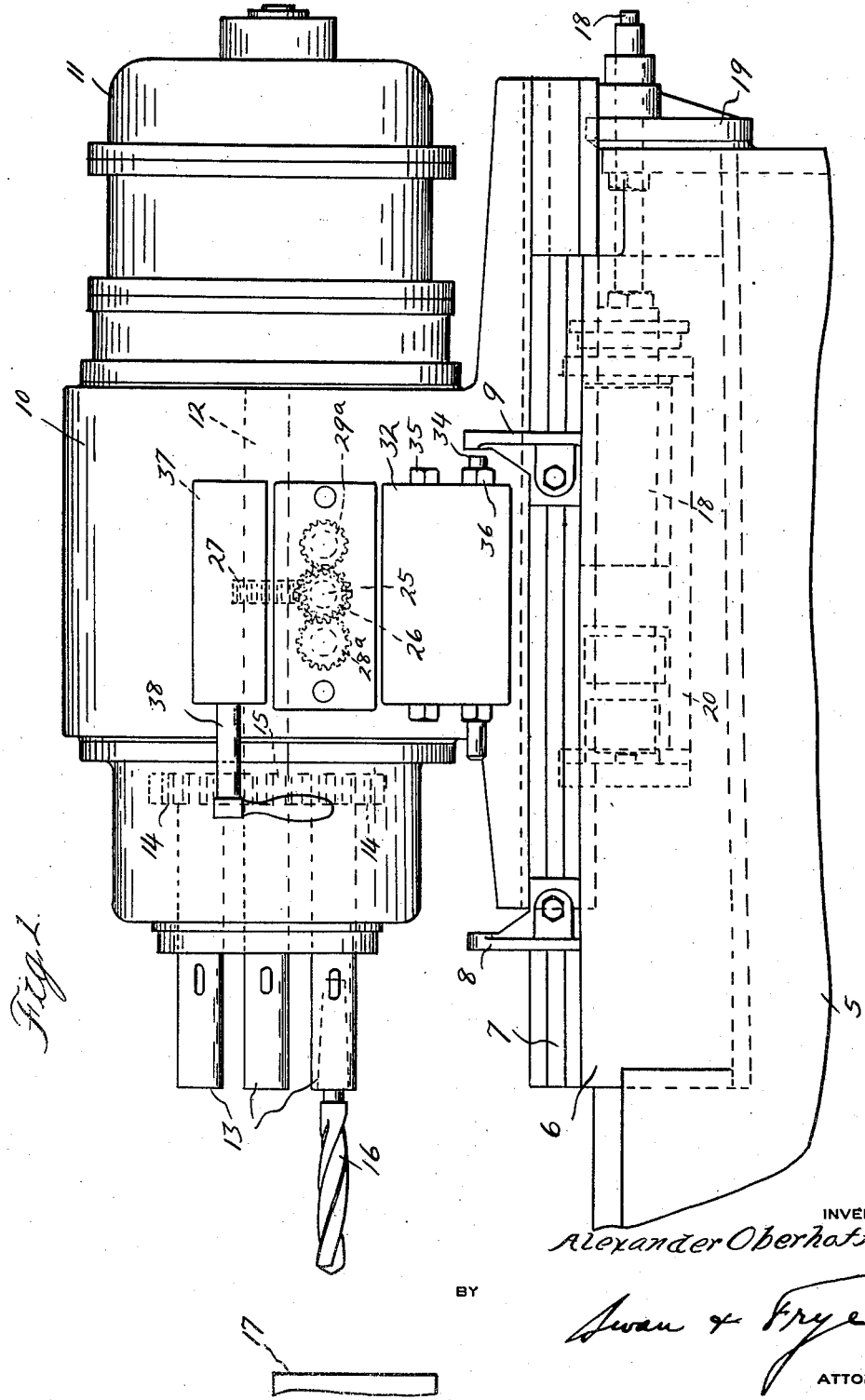
INVENTOR
Alexander Oberhoffken
BY
Swan & Frye.
ATTORNEYS

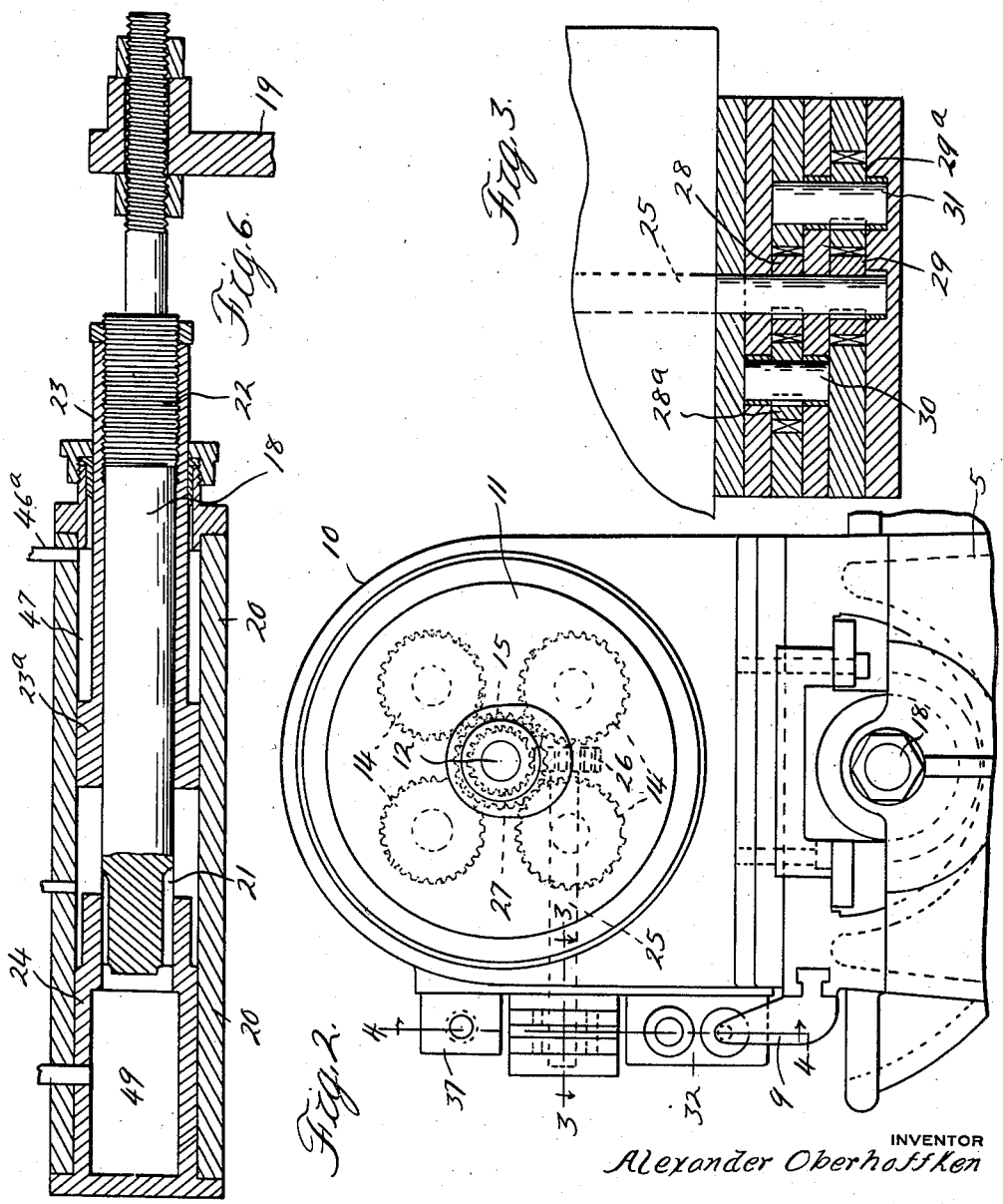

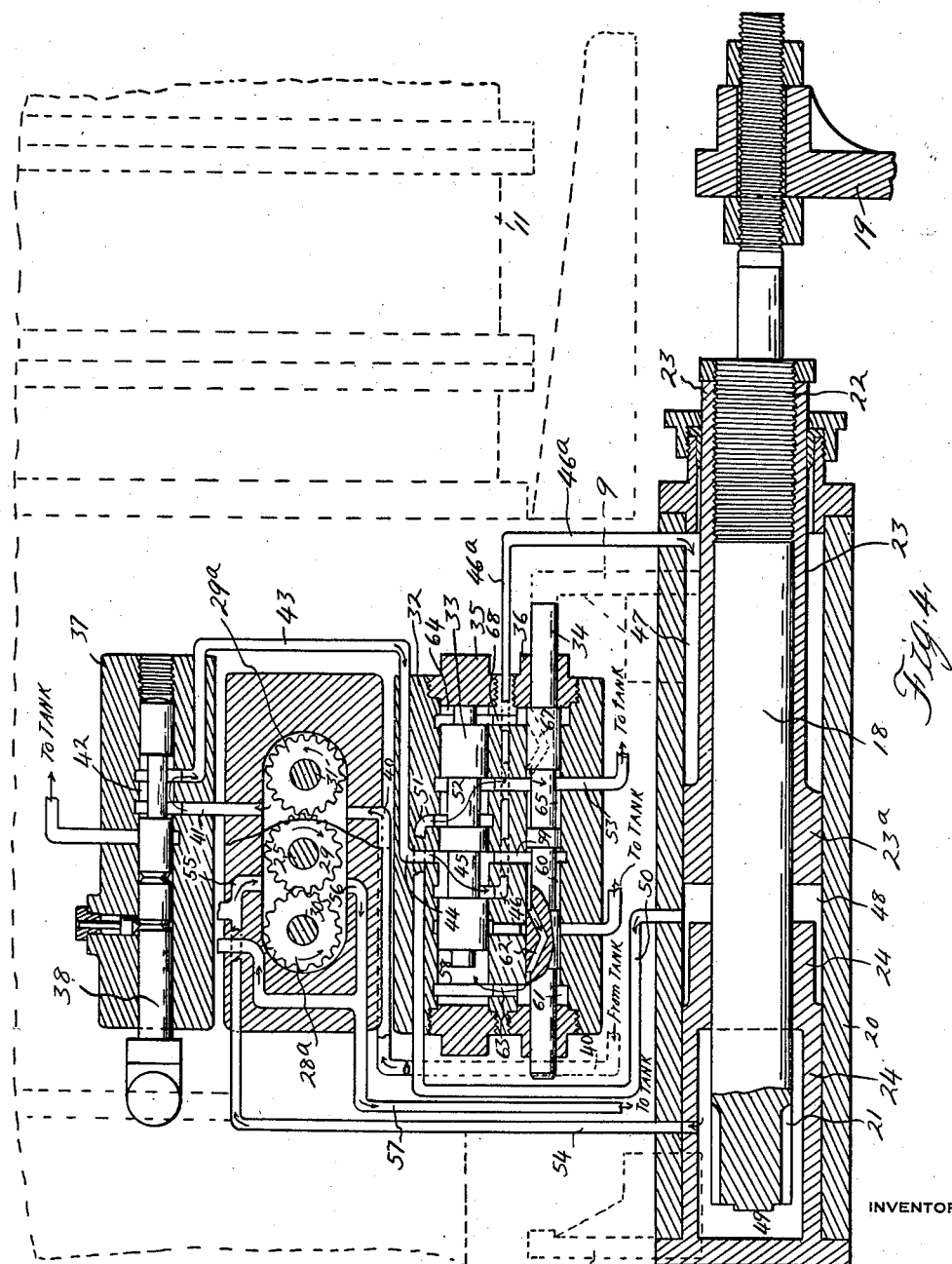

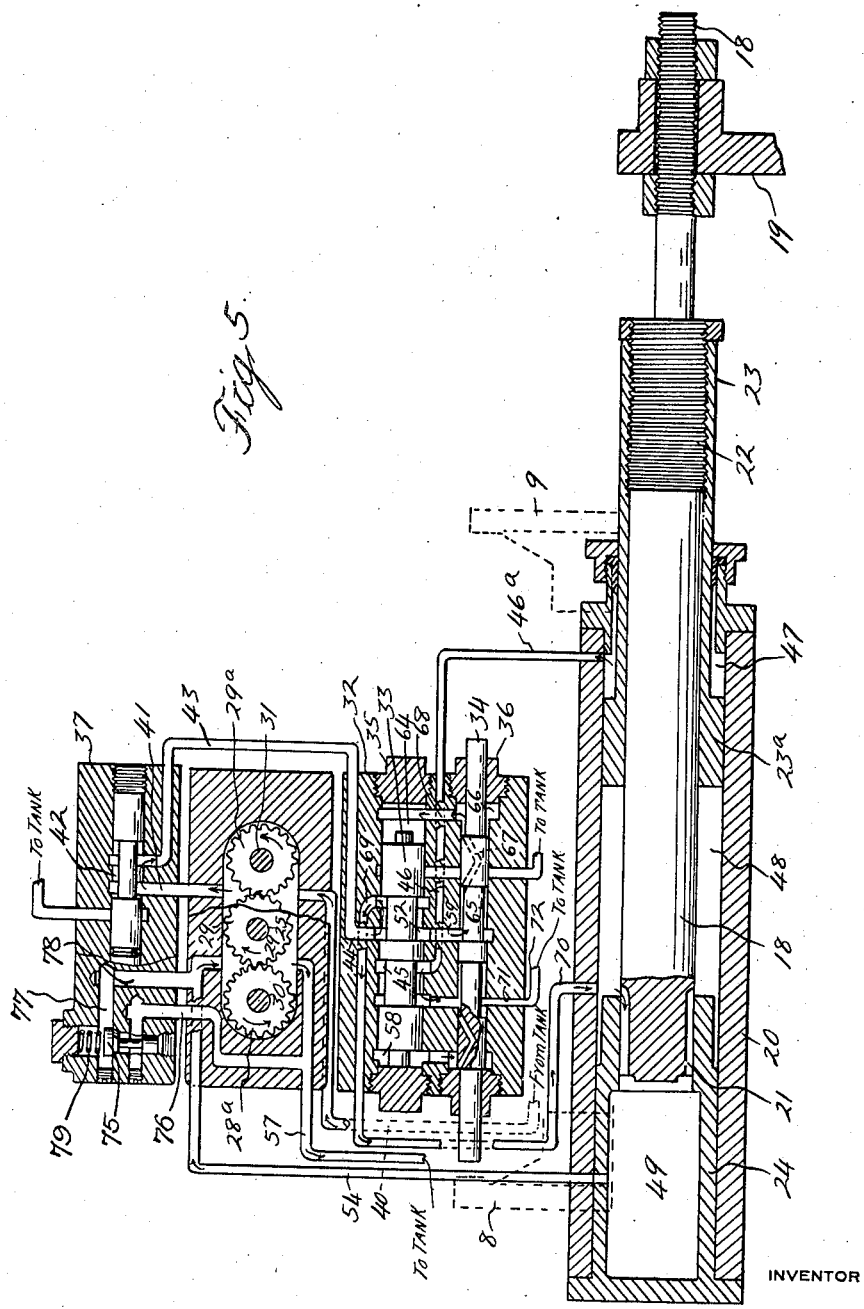

Patented Jan. 23, 1934

1,944,362

UNITED STATES PATENT OFFICE 1,944,362

HYDRAULIC FEED FOR MACHINE TOOLS

Alexander Oberhoffken, Detroit, Mich., assignor to Production Engineering Company, Detroit, Mich., a corporation of Michigan Application March 11, 1929. Serial No. 345,981

11 Claims. (Cl. 60—52)

This invention relates to machine tool units for performing various types of operations, such as multiple and single drilling, boring, tapping, grinding, hollow milling and broaching, and more particularly to means for advancing and retracting the units as desired.

One of the objects of this invention is the provision of a machine tool unit including a hydraulic feed system for the advancement and retraction of the unit as one of its constituent parts so that the major portion of the feed system travels with the unit.

Another object of this invention is the mounting upon a self-contained machine tool unit of a variable speed hydraulic feed mechanism whereby a quick approach to and return of the unit from the work may be readily secured as well as a relatively slow feeding of the unit as its tools are performing their desired operations.

A further object of this invention is the arrangement of a hydraulically actuated feed mechanism upon the unit to cooperate with a stationary piston adjustably fixed upon the base of the machine tool whereby a cycle of operations may be automatically repeated as long as desired, consisting of advancing the unit first rapidly and then slowly for predetermined distances and then quickly retracting the unit.

A further object of this invention is the provision of a novel hydraulic feed mechanism for machine tool units, etc., having two gear pumps of different capacities simultaneously driven and so connected that the larger pump provides the necessary fluid at requisite pressure for a quick approach to the work and quick return of the unit, and when desired the smaller pump diverts a portion of the output of the larger one so that the effective fluid serving to move the unit at such times is merely the difference between the outputs of the two pumps, resulting in a slow feeding of the unit, as during the operation of the tools of the unit upon the work.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a side elevation of a machine tool unit embodying my invention.

Figure 2 is a rear elevation thereof.

Figure 3 is a horizontal section through the gear pumps, taken substantially on the line 3—3 of Figure 2.

Figure 4 is an enlarged vertical section taken substantially on the line 4—4 of Figure 2, and showing the feed mechanism with the valves as arranged during the return movement of the unit.

Figure 5 is a view similar to Figure 4, but showing the feed mechanism with the valves as arranged during the advance movement of the unit toward the work, and also showing the automatic relief valve for the pump of lesser capacity and its appurtenant passages and Figure 6 is a detail longitudinal section through the cylinder and piston of the feed mechanism.

Referring now to the drawings, the numeral 5 designates the base of a machine tool carrying in its upper extremity a bed plate 6 having a longitudinal groove 7 in its side edge for the convenient mounting of a pair of adjustable stops 8 and 9 whereby the extent of travel in opposite directions of a machine tool head or unit 10 may be readily controlled. The head or unit 10 is preferably what is known as a self-contained unit carrying its own motor 11 for the rotation when desired of the drive shaft 12, which shaft carries suitable pinions for actuating any desired number of tool spindles and also for actuating the hydraulic feed mechanism hereinafter described. It is to be understood that any desired machine tool head or unit 10 can be employed in connection with the claimed subject matter of the present invention, and that such heads or units 10 may be variously tooled for performing the various types of work of which machine tools are capable.

The illustrated embodiment is shown by way of example, and comprises a plurality of spindles 13 suitably mounted in the forward extremity of the unit 10 and simultaneously driven from the drive shaft 12, as by means of pinions 14 mounted on the spindles 13 and meshing with a drive gear 15 fixed upon the drive shaft 12 (note Figures 1 and 2). Any suitable tools, such as drills 16, may be mounted at the forward extremities of the spindles 13.

The claimed subject matter of the present invention comprises means for feeding the unit 10 to first bring its various tools 16 into engagement with the work, as 17, suitably positioned relatively to the base 5 of the machine tool, then more slowly feed the unit while the tools 16 are performing their desired operations upon the work 17, and then quickly returning the unit to its original position. This cycle of advance and return movements of the head may be automatically repeated as long as desired, it being understood that the work 17 is suitably changed during the return and preliminary advance movements of the unit. My improved feed mechanism includes a piston 18 adjustably clamped adjacent its rear extremity upon a bracket 19 carried by the base 5 of the machine tool, and a cylinder 20 encircling the piston 18 and slidable thereover, which cylinder is rigidly mounted upon the unit 10 for movement therewith. The piston 18 in the illustrated embodiment has a plurality of peripheral grooves 21 extending from the free extremity of the piston, substantially as shown in Figures 4 and 6, and is threaded, as at 22, adjacent its fixed extremity to adjustably mount a sleeve 23 formed with its major portion of reduced diameter relatively to its end portion 23ª which is machined to snugly fit within the bore of the cylinder 20. The enlarged portion 23ª of the sleeve 23 acts as an abutment against which pressure is brought through the fluid of the feed mechanism to both advance and retract the cylinder 20 to which the unit 10 is secured, and the adjustability of the sleeve 23 provides means for regulating the extent of travel of the cylinder in both directions during any desired cycle of operation. Moreover, the adjustable mounting of the fixed extremity of the piston 18 in the bracket 19 permits ready changing of the position serving as the start and finish of the cycle of operations controlled by the feed mechanism. The cylinder 20 is preferably formed with a peripheral wall suitably apertured for connection with the various inlet and exhaust pipes for the fluid, a head at the rear extremity of the peripheral wall suitably arranged to snugly fit over the reduced portion of the sleeve 23, and a head at the forward extremity of the peripheral wall which carries a rearwardly extending hollow cylindrical portion 24, the major portion of which snugly fits within the peripheral wall of the cylinder while the rear extremity of the portion 24 has a reduced diameter whereby it is spaced from the peripheral wall. Also, the reduced portion of the member 24 has a central opening snugly fitting over the piston 18 while the larger diametered portion of the member 24 is formed with a central aperture of greater diameter than the piston 18 to provide a chamber for the reception of fluid during a portion of the cycle of operations of the said mechanism.

The means for pumping the hydraulic fluid is best shown in Figures 2, 3 and 4, and comprises a lateral shaft 25 carrying at one extremity a worm gear 26 meshing with a worm pinion 27 fixed on the drive shaft 12, and carrying adjacent its opposite extremity a pair of spur gears 28 and 29 (note Figure 3) which mesh respectively with a pair of spur gears 28ª and 29ª mounted on stub shafts 30 and 31 suitably fixed in the pump housing. The intermeshing gears 28, 28ª and 29, 29ª constitute gear pumps for forcing the fluid of the feed mechanism through conduits, as hereinafter described. One of the gear pumps, as 28, 28ª, is of lesser capacity than the other gear pump as 29, 29ª, and for purposes of example, it is assumed herein that the gears of the pump 28, 28ª have a width of seven-sixteenths of an inch while the gears of the pump 29, 29ª have a width of one-half an inch. Accordingly, when the two pumps are simultaneously operating and the smaller pump is connected to divert the greater part of the output of the larger pump, the effective fluid serving to move the cylinder 20 and attached unit, is merely that in excess of the fluid diverted by the smaller pump, or in other words, the difference in capacity between the two pumps.

As above described, the cylinder 20 is secured to the machine tool unit so as to move therewith under the influence of the fluid pumped by the described gear pumps. The connections whereby such movements are secured will now be described, it being understood that the illustrated embodiment is intended merely for purposes of exemplification and that other connections and arrangements between the pump and cylinder may be employed in connection with my invention. Secured upon the machine tool unit so as to travel therewith, and preferably below the gear pump casing hereinbefore described, is a valve control casing 32 (note Figure 1), and mounted to reciprocate within such casing are a pair of valve members 33 and 34, both of which are herein shown as cylindrical rods grooved and apertured to provide passages for proper distribution of fluid. The upper or main valve member 33 is shown in Figure 4 at one extreme of its movement and in Figure 5 at the opposite extreme of its movement, being limited in its movements by adjustable plugs 35 threaded in the end walls of the casing 32. The position of this main valve member 33 is controlled by means of the lower or auxiliary control member 34, which is likewise shown in one extreme of its movement in Figure 4 and in its opposite extreme in Figure 5, and its movements are limited by adjustable stops 36 threaded in the end walls of the casing 32. It will be noted that no springs are utilized in moving or maintaining the positions of either of the valve members 33 or 34, but that instead all positioning is done by means of the fluid itself or by contact with the adjustable abutments 8 and 9 engaging the projecting end portions of the auxiliary control member 34. Preferably mounted above the pump casing is a secondary control casing 37, wherein is mounted a manually controlled valve member 38 whereby movement of the machine tool unit may be effected at any time in the cycle of its operations. The pump casing as well as the valve control casing 32 and the secondary manual valve control casing 37 are interconnected by a series of passages or conduits through which the fluid may flow in the operation of the hydraulic feed system disclosed, substantially in the manner now to be described.

First considering Figure 4, wherein the machine tool unit and attached parts are moving rearwardly and have arrived at almost their rearmost positions, the various valves, control positions, and fluid conduits operating at this time are as follows. From the fluid container or tank (not shown) fluid is drawn through the conduit 40 to the underside of the wide gear pump 29, 29ª, and emerges from the pump through the conduit 41 leading to the passageway 42 in the secondary or manual control casing 37 and thence downwardly through the conduit 43 to the passageway 44 leading to the seat of the main valve member 33, which at this time is located with its rear extremity in engagement with the rear stop member 35 and accordingly presents a grooved portion 45 to the passageway 44 while at the same time connecting the passageway 44 with the passageway 46 leading from the lower portion of the valve seat and communicating with the conduit 46ª which at its lower extremity communicates with the chamber 47 between the rear face of the enlarged portion 23ª of the piston sleeve 23 and the rear closure for the cylinder 20. Accordingly, the continued rotation of the wide gear pump 29, 29ª will supply fluid under pressure to the chamber 47 directly from the pump and with the full capacity of the pump operating to quickly fill the chamber 47 and so quickly move the cylinder 20 and the machine tool unit rearwardly. During such rearward movement of the cylinder, the fluid which had been contained within the chamber 48 located between the forward face of the enlarged piston sleeve portion 23ª and the rear portion of the cylinder sleeve member 24, and the chamber 49 located at the forward extremity of the cylinder sleeve member 24 will be forced out of such chambers by the reduction in area of such chambers as the cylinder approaches its extreme rearmost position. The fluid thus forced out of the chamber 48 escapes into the storage container for fluid during the major portion of the travel of the cylinder rearwardly. Thus the fluid from the cylinder 48 passes upwardly through the conduit 50 to the passageway 51 in the upper portion of the valve casing 32, which passageway communicates, while the valve member 33 is in its rearmost position, with the grooved portion 52 of such valve member 33 and the grooved portion 52 connects the passageway 51 with the passageway 53 leading from the underside of the main valve cylinder seat to the storage tank for the fluid. At the same time, the fluid from the chamber 49 passes upwardly through the conduit 54 to the passageway 55 forming the inlet for the narrow gear pump 28, 28ª, and emerges from this pump through the passageway 56 which communicates with the conduit 57 connecting the pump casing with the storage tank for fluids. While the fluid from the side pump 29, 29ª is being forced into the chamber 47, to effect the rearward travel of the cylinder 20, a portion of such fluid is diverted to the chamber 58 between the forward extremity of the main valve member 33 and the foremost plug in the valve casing 32 to maintain the main valve member 33 in its rearmost position despite variations in pressure on the fluid. Such diversion of fluid is secured by connecting the grooved portion 45 of the valve member 33 with the chamber 58, as through the passageway 59 leading from the lower portion of the seat of the main valve member 33 to the upper portion of the seat of the lower or auxiliary valve control member 34, where it communicates with a grooved portion 60 of such auxiliary control member 34 while the control member 34 is in its rearmost position (note Figure 4). The grooved portion 60 of the lower control member 34 communicates with a forward grooved portion 61 of such control member through the V-shaped passageway 62, and the forward grooved portion 61 communicates with the chamber 58 through the passageway 63. The amount of liquid entering the chamber 58 to maintain the main valve member 33 in its rearmost position is quite small compared with the amount of fluid forced from the pump into the chamber 47, but it will always be at substantially the same pressure as that of the liquid entering the chamber 47.

After rearward travel of the cylinder 20 and attached machine tool unit has brought the rearmost portion of the lower or auxiliary valve control member 34 into engagement with the abutment 9, further movement of the cylinder rearwardly will force the valve control member 34 from its rearmost position as shown in Figure 4, to its foremost position, as shown in Figure 5. Such movement of this lower valve control member 34 serves to divert fluid under pressure to the chamber 64 between the rear plug 35 and the rear face of the main valve control member 33 to thereby move the main valve member 33 from its rearmost position, as shown, in Figure 4, to its foremost position, as shown in Figure 5. This diversion of fluid is effected from the grooved portion 45 of the main valve control cylinder through the passageway 59 to the grooved portion 65 in the lower valve control member 34, which, when the control member 34 is in its foremost position, is in communication with the passageway 59. The grooved portion 65 of the control member 34 communicates with a rear grooved portion 66 of such control member through the V-shaped passageway 67 and accordingly fluid entering around the grooved portion 65 of the control member 34 will be transmitted through the V-shaped passageway 67, rear grooved portion 66 and the passageway 68 to the chamber 64 to shift the main valve member 33.

When the main valve member 33 is in its foremost position, as shown in Figure 5, fluid will be fed from the wide pump 29, 29ª to the chamber 48 in the cylinder 20, the fluid passing from the wide pump through the conduits and passageways 41, 42, 43 and 44 hereinbefore described to the grooved portion 52 of the main valve control member 33, which is now in communication with the passageway 44, and thence emerges through the passageway 69 and conduit 70, to the chamber 48. As shown in Figure 5, the grooved portion 52 of the main valve member 33 connects the passageways 44 and 69, and at the same time connects the passageway 44 with the passageway 59, leading from the lower portion of the seat of the valve member 33 to the grooved portion 65 of the auxiliary valve control member 34, whence a portion of the fluid is forced through the V-shaped passageway 67, grooved portion 66, and passageway 68, into the chamber 64 to maintain the main valve member in its foremost position regardless of changes in pressure on the fluid. The fluid entering the chamber 48 in the cylinder 20 quickly forces the cylinder 20 and attached machine tool unit forwardly until such time as the peripheral grooves 21 of the piston emerge from their positions within the cylinder sleeve 24 (note Figure 5), after which a portion of the liquid entering the chamber 48 will flow into the larger chamber 49 to fill such chamber and be drawn therefrom by the narrow gear pump 28, 28ª through the conduit 54 and passageway 55. Accordingly, when the peripheral grooves 21 are communicating with the chamber 48, the speed of forward travel of the cylinder 20 and the attached machine tool unit will be very materially decreased because the larger portion of the fluid supplied to the chamber 48 is drawn off through the grooves 21 and chamber 49 without exerting pressure to move the cylinder 20 forwardly. In fact, the speed of forward movement of the cylinder 20 will be caused solely by the greater capacity of the wide pump 29, 29ª relatively to that of the narrow pump 28, 28ª, and accordingly, will be in proportion to the difference in capacities between the two pumps.

It will be apparent that before the grooves 21 have been freed from engagement by their movement away from the cylinder 24, the chamber 49 cannot supply the pump 28, 28ª with its required input necessary to keep it operating freely, and that the same condition will obtain during other phase of the operation of the device. For that reason I provide the relief valve 75, which normally closes a return passage, 76, 77, 78, from the output to the input side of the pump, as shown in Figure 5. This structure I find it convenient to embody in the manual valve control casing 37. The valve 75 is normally held in yieldably closed position by the spring 79, which offers such resistance to its opening that when the pump is obtaining its normal supply from the chamber 49 the valve will remain closed, but when the chamber 49 cannot supply the necessary input, the valve 75 opens, relieving the pump by furnishing a direct connection between its output and its input sides; as will be apparent from Figure 5.

While the cylinder 20 is moving forwardly, the fluid which had been contained in the chamber 47 will be forced outwardly through the conduit 46ª and passageway 46, to the grooved portion 45 of the main valve member 33, which in the foremost position of the valve member 33 connects the passageway 46 with the passageway 71 communicating with a conduit 72 connected with the storage tank for the fluid.

After forward movement of the cylinder 20 brings the forward extremity of the auxiliary control member 34 into engagement with the abutment 8, further movement of the cylinder will serve to move the control member 34 from its foremost position, as shown in Figure 5, to its rearmost position as shown in Figure 4, and such movement of the valve control member 34 will serve to divert a portion of the fluid to the chamber 58 between the forward plug 35 and the forward extremity of the main valve member 33 to thereby shift the main valve member 33 from its foremost to its rearmost position, whereupon the various grooved portions of the main valve member 33 and control valve member 34 take the position shown in Figure 4 whereby fluid is fed from the wide pump 29, 29ª to the chamber 47 to effect the rearward movement of the cylinder 20 and attached machine tool unit. The cycle of operations may obviously be continued as long as desired, and the machine tool unit will be rapidly moved from its rearmost position for a portion of its forward stroke and then slowly for the remainder of such stroke, after which it will be rapidly moved from its extreme forward position to its rearmost position. By suitably positioning the abutments 8 and 9, the length of such strokes may be readily controlled and by varying the length of the cylinder sleeve member 24 to vary the time in the forward stroke at which the peripheral grooves 21 enter the chamber 48, differences in the proportion of the slow to the rapid movements in the forward stroke may be secured at will. Likewise, changes in the position of the piston 18 or of its adjustable sleeve 23 will serve to change the starting position and length of stroke of the cylinder. It is to be understood that, of course, cylinders and pistons of various dimensions can be employed at will and that the several piston and cylinder parts may be changed as needed to secure the desired movements of the machine tool unit. Also it is to be understood that the capacities of the relatively wide and narrow gear pumps may be changed at will by substituting gear pumps of different widths, diameters, number of teeth, etc.

Many different fluids may be used in the operation of my improved hydraulic feeding mechanism, such as oil or glycerine.

Obviously, the machine tool unit and attached cylinder may be mounted to move in any direction, as horizontally, vertically, or at intermediate angles, and further, may be controlled to move in a curvilinear path, if desired, by suitably shaping the cylinder 20 and piston 18.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, what I claim is:

1. In a hydraulic driving and feed system, a driven member, means for reciprocating the driven member at variant speeds, comprising a hydraulic pump, means including a piston and cylinder actuatable by the full output of the pump and capable of moving the driven member relatively rapidly to and fro, and means for slowing the driven member during part of each reciprocating cycle, comprising means for drawing part of the output of the pump from the cylinder during a portion only of each cycle, to prevent the application of the full output of the pump thereto.

2. In a fluid pressure control and motivating system, a support, fixed stops carried thereby, a driven member, means for continuously reciprocating the driven member, comprising a hydraulic pump, a second hydraulic pump of variant capacity from the first, both pumps being reciprocable with the driven member, a piston fixed to the support, a cylinder reciprocable with the driven member, including a separate portion enclosing only a part of the piston but connectible with another part of the cylinder, and means for automatically varying the speed and reversing the direction of the reciprocation comprising a valve also reciprocable with the driven member and shiftable by engagement with the fixed stops, said valve directing the output of one pump to first one side of the piston and then the other, while the input of the other pump is constantly connected to said separate portion of the piston.

3. In a hydraulic driving and control system, a base, a driven member reciprocable relatively thereto, and hydraulically actuated means for continuously reciprocating the driven member including a pair of pumps of variant capacities, and cooperating piston and cylinder members, one of which is carried by the driven member and the other by the base, the piston and cylinder having each a plurality of effective areas by means of which they may be urged in each direction relatively to each other, and a valve member shiftable in response to movement of the cylinder to apply the output of one pump alternately to opposite sides of a piston member to urge the cylinder first in one direction and then in another relatively to the piston, while the input of another pump is continuously connected to another cylinder portion to urge the cylinder by suction in one direction, and means operable by movement of the cylinder for automatically by-passing part of the output of one pump to the input of the other in certain phases of the reciprocal movement to vary the speed of travel of the driven member.

4. In a hydraulic driving and control system, a support, a driven member reciprocable relatively to the support, and hydraulically actuated means for reciprocating the driven member comprising two cooperating pumps of different capacities, and means for applying the outputs of the pumps to drive said driven member by a force alternately produced by the difference between the outputs of said pumps and one of said pumps acting alone, including a piston and cylinder, and means including a valve shiftable in response to movement of the driven member to apply the full output of one of the pumps first to one side of the piston and then the other, means intermittently connecting the input of the second pump to one of said cylinder portions to which the output of the first pump is alternately connected, to absorb part of the output of the first pump from the cylinder.

5. In a hydraulic driving and control system, a support, a driven member reciprocable relatively to the support, and hydraulically actuated means for reciprocating the driven member comprising a plurality of pumps of different capacities, a piston and cylinder, one affixed to the support and the other to the driven member, and a valve automatically shiftable with reciprocation of the driven member and controlling the output of one of said pumps to cause the same to urge the cylinder and piston in first one relative direction and then another, while the input of the other pump is so connected as to constantly urge them in one direction, and intermittently to absorb part of the output of the first pump.

6. In a hydraulic driving and control system, a support, a unit reciprocable upon the support, and hydraulically actuated means for reciprocating the unit relatively rapidly during a portion of each reciprocating cycle and relatively slowly during another portion, comprising two pumps of different capacities, a piston and cylinder, one affixed to the support and the other to the unit, and a valve automatically shiftable with reciprocation of the unit and controlling the input and output of one of said pumps to cause the same to urge the cylinder and piston in first one relative direction and then the other, while the input of the other pump is so connected as to constantly urge them in one direction, and an automatic by-pass rendered effective at certain phases of each operating cycle to permit part of the output of the first mentioned pump to pass directly to the input of the other, thereby varying the effective output of the latter and the rate of travel of the unit.

7. In a hydraulic driving and control system, a support, a driven member reciprocable relatively to the support, and hydraulically actuated means for reciprocating the driving member relatively rapidly during a portion of each reciprocating cycle and relatively slowly during another portion, including cooperating cylinder and piston members, means for actuation thereof comprising two pumps producing variant outputs, said piston having a plurality of effective surfaces and said cylinder having a plurality of normally isolated chambers for cooperation therewith, said piston and cylinder being carried one by the support and the other by the driven member, and an automatic control valve shiftable in accordance with the position of the driven member during its reciprocation to connect the output of one of said pumps first to one cylinder chamber and then to another, thereby reciprocating the cylinder and piston relatively to each other, the input of the other pump being constantly connected to another cylinder chamber to urge them in one direction with a force less than that of the other pump, and a by-pass automatically opened during certain phases of each operating cycle to connect said last mentioned chamber with one of the others fed by the output of the first pump, to thereby reduce the rate of travel of the unit.

8. In a hydraulic driving and control system, a support, a driven member reciprocable relatively to the support, and hydraulically actuated means for reciprocating the driven member relatively rapidly during a portion of each reciprocating cycle and relatively slowly during another portion, including cooperating cylinder and piston members, said cylinder having a plurality of chambers, one of said members being mounted upon the driven member and another upon the support, means for causing relative movement thereof comprising two pumps of variant capacities, an automatically shiftable valve for directing the output of one of the pumps first to one chamber and then to another to cause reciprocation of the driven member, the other pump being connected to still another chamber, and means for partially by-passing the output of one pump to the input of the other automatically during certain phases of each reciprocating cycle to vary the speed of travel of the driven member.

9. In a hydraulic driving and control system, a support, a driven member reciprocable relatively to the support, and hydraulically actuated means for reciprocating the driven member relatively rapidly during a portion of each reciprocating cycle and relatively slowly during another portion, including cooperating cylinder and piston members, one of which is mounted upon the driven member and the other upon the support to form a plurality of chambers between the end walls of the cylinder and piston, and means for supplying fluid under pressure to any of said chambers, including a gear pump, and another gear pump of lesser capacity arranged to withdraw fluid from one of said chambers during a portion of the travel of the driven member and while the pump of greater capacity is simultaneously delivering fluid to said chamber.

10. In a hydraulic driving and control system, a support, a driven member reciprocable relatively to the support, and hydraulically actuated means for automatically and repeatedly reciprocating the unit relatively rapidly during a portion of each reciprocating cycle and relatively slowly during another portion, including cooperating cylinder and piston members, one of which is mounted upon the driven member and the other upon the support, a plurality of gear pumps of different capacities, means for applying the output of one of said pumps to reciprocate the driven member, and means for automatically and intermittently connecting the entire input of a smaller of said pumps to the output of a larger pump to change the speed of travel of the driven member.

11. In a hydraulic driving and control system, a support, a driven member reciprocable relatively thereto, and hydraulically actuated means for automatically reciprocating the driven member relatively rapidly during a portion of each reciprocating cycle and relatively slowly during another portion, and for continuing such reciprocation as long as desired, including cooperating cylinder and piston members, one of which is mounted upon the driven member and the other upon the support, the cylinder having a plurality of chambers, and means for supplying fluid under pressure to first one and then another of said chambers to reciprocate the driven member, comprising a pump, a valve shifting mechanism operable in response to movement of the unit to automatically divert the output of the pump to first one and then another of said chambers at predetermined positions of travel of the unit, a second pump of variant capacity from the first and connected to another and normally isolated operative cylinder chamber, and valve means also shiftable in response to movement of the unit for automatically and intermittently connecting the last mentioned chamber with one of the others to change the rate of travel of the driven member.

ALEXANDER OBERHOFFKEN.